United States Patent [19]

Novakovich et al.

[11] Patent Number: 5,353,413
[45] Date of Patent: Oct. 4, 1994

[54] METHOD AND APPARATUS FOR CHRISTENING A TRAINLINE MONITOR SYSTEM

[75] Inventors: Michael R. Novakovich; Joseph S. Majewski, both of Pittsburgh, Pa.

[73] Assignee: AEG Transportation Systems, Inc., Pittsburgh, Pa.

[21] Appl. No.: 853,796

[22] Filed: Mar. 19, 1992

[51] Int. Cl.$^5$ .................... G06F 13/00; G06F 11/16
[52] U.S. Cl. ................. 395/325; 364/DIG. 1; 364/229; 364/229.2; 364/229.4; 364/232.7; 364/436; 371/24.5
[58] Field of Search ............... 395/32.5, 200, 800; 303/3, 16; 364/132, 562, 436; 105/35; 340/171 A, 825.02; 371/29.5, 8.1

[56] References Cited

U.S. PATENT DOCUMENTS

| | | | |
|---|---|---|---|
| 4,181,369 | 1/1980 | Balukin et al. | 303/16 |
| 4,257,032 | 3/1981 | Schneider | 340/171 A |
| 4,434,463 | 2/1984 | Quinquis et al. | 395/200 |
| 4,652,057 | 3/1987 | Engle et al. | 303/3 |
| 4,702,291 | 10/1987 | Engle | 105/35 |
| 4,727,475 | 2/1988 | Kiremidjian | 395/325 |
| 4,967,344 | 10/1990 | Scavezze et al. | 395/575 |
| 5,036,478 | 7/1991 | MacDougall | 364/562 |
| 5,038,140 | 8/1991 | Ikeuchi | 340/825.02 |
| 5,053,964 | 10/1991 | Mister et al. | 364/424.01 |
| 5,086,499 | 2/1992 | Mutone | 371/8.1 |
| 5,136,496 | 8/1992 | Tsuboi | 364/132 |
| 5,148,389 | 9/1992 | Hughes | 395/800 |
| 5,175,822 | 12/1992 | Dixon et al. | 395/275 |
| 5,179,670 | 1/1993 | Farmwald et al. | 395/325 |
| 5,247,522 | 9/1993 | Reiff | 371/29.5 |

OTHER PUBLICATIONS

ISO 4335, Third Edition, "Information Processing Systems Data Communication—High-Level Data Link Control Elements of Procedures," International Organization for Standardization, Jan. 8, 1987.

Draft DIN 43322 German Standard specification, Parts 1, 2, 4 and 5 dated Jun. 1988 and Part 3 dated Jul. 1988, Parts 1-5 in English and Part 3 in German also.

*Primary Examiner*—Allen R. MacDonald
*Assistant Examiner*—Ayaz R. Sheikh
*Attorney, Agent, or Firm*—Spencer, Frank & Schneider

[57] ABSTRACT

A method for initializing a communication network in a train including a plurality of cars, the network comprising a train bus, a train bus master on one of the cars and a train bus slave on each other car connectable to the train bus master by the train bus for communicating with the train bus master. The method includes determining whether the one car with the train bus master is located at one end of the train or is in the middle of the train. The method further includes transmitting first messages between the train bus master and each train bus slave, respectively, located in one direction for assigning an address to each train bus slave located in that one direction and acquiring data at the train bus master uniquely identifying the respective train bus slaves in that one direction. The method further includes transmitting, when the determining step determines that the one car is located in the middle of the train, second messages between the train bus master and each train bus slave, respectively, located in an other direction for assigning an address to each train bus slave located in the other direction and acquiring data at the train bus master uniquely identifying the respective slaves in the other direction.

18 Claims, 7 Drawing Sheets

METHOD AND APPARATUS FOR CHRISTENING A TRAINLINE MONITOR SYSTEM

CROSS REFERENCE TO RELATED APPLICATIONS

This application is related to the following copending applications assigned to the same assignee as the present application which are hereby incorporate by reference:

U.S. patent application Ser. No. 07/686,927, entitled "PROPULSION CONTROL SYSTEM CENTRAL PROCESSING UNIT BOARD" filed Apr. 18th, 1991, by William F. Molyneaux;

Ser. No. 08/029,348 which is a continuation of Ser. No. 07/853,250 (now abandoned) Attorney Docket No. AWA-0376, by Michael R. Novakovich and Joseph S. Majewski, entitled "A METHOD AND APPARATUS FOR MONITORING AND SWITCHING OVER TO A BACK-UP BUS IN A REDUNDANT TRAINLINE MONITOR SYSTEM" filed Mar. 18th, 1992;

Ser. No. 07/853,420, Attorney Docket No. AWA-0377, by Joseph S. Majewski, entitled "COLLISION HANDLING SYSTEM" filed Mar. 18th, 1992;

Ser. No. 07/853,540, Attorney Docket No. AWA-0379, by Michael R. Novakovich and Richard D. Roberts, entitled "A METHOD AND APPARATUS FOR LOAD SHEDDING USING A TRAINLINE MONITOR SYSTEM" filed Mar. 18th, 1992, allowed to September 1993;

Ser. No. 07/853,960, Attorney Docket No. AWA-0380, by Michael R. Novakovich and Joseph S. Majewski, entitled "MULTI-MASTER RESOLUTION OF A SERIAL BUS" filed Mar. 18th, 1992, allowed August 1993;

Ser. No. 07/853,251, Attorney Docket No. AWA-0382, by Michael R. Novakovich and Richard D. Roberts, entitled "A METHOD AND APPARATUS FOR PLACING A TRAINLINE MONITOR SYSTEM IN A LAYUP MODE" filed Mar. 18th, 1992, allowed December 1993;

Ser. No. 07/853,186, Attorney Docket No AWA-0383, by Henry J. Wesling, Michael R. Novakovich and Richard D. Roberts, entitled "REAL-TIME REMOTE SIGNAL MONITORING" filed Mar. 18th, 1992;

Ser. No. 07/853,402, Attorney Docket No. AWA-0391, by William F. Molyneaux, entitled "COMMUNICATIONS CONTROLLER CENTRAL PROCESSING UNIT BOARD" filed Mar. 18th, 1992;

Ser. No. 07/853,204, Attorney Docket No. AWA-0394, by Henry J. Wesling, Michael R. Novakovich and Richard D. Roberts, entitled "DISTRIBUTED PTU INTERFACE" filed Mar. 18th, 1992, allowed June 1993; and

BACKGROUND OF THE INVENTION

1. Field of the Invention

This invention relates generally to a method and an apparatus for christening a network having a primary bus and a back-up bus interconnecting a master node and at least one slave node and in particular to a method and apparatus for christening a trainline monitor system having a primary train bus and a back-up train bus interconnecting a primary master node with at least one primary slave node and a back-up master node with at least one back-up slave node, respectively.

2. Description of the Related Art

A train communication system is being developed by the assignee of the present application which, based on the proposed European specification DIN 43322 for "Serial Interfaces to Programmable Electronic Equipment for Rail Vehicles," incorporated herein by reference, enables a master node located typically in a head car of a train to communicate via a serial bus to slave nodes on middle cars of the train and on a tail car of the train. See also, "International Standard-Information processing systems-Data communication-High-level data link control elements of procedures, ISO 4335", Third edition, Global Engineering Documents, Irvine, Calif., 1987, the subject matter of which is also incorporated herein by reference.

Part 3 of "Serial Interfaces to Programmable Electronic Equipment For Rail Vehicles," June 1988, Section 4.2.4 discloses a method and apparatus for christening or initializing a trainline monitor system. Appendix A in part 3 discusses one approach to christening a trainline monitor system using a serial bus to interconnect a master node with slave nodes on the trainline monitor system. However, the process disclosed in the reference only allows for a train bus master (master node) to be at one of the ends of the train and not, for example, to operate in the middle of the train or to push rather than to pull a train. Furthermore, the reference does not discuss how to christen a trainline monitor system which has redundant train buses interconnecting redundant master nodes with redundant slave nodes.

SUMMARY OF THE INVENTION

An object of the invention is therefore to provide a method and apparatus for christening a trainline monitor system for a train which has a master node on a "head" car which is located anywhere on the train.

Another object of the invention is to provide a method and apparatus for christening a trainline monitor system which has redundant master nodes, redundant slave nodes and redundant train buses.

These and other objects, advantages and features are accomplished by the provision of a method for initializing a communication network in a train including a plurality of cars, the network comprising a train bus, a train bus master on one of the cars and a train bus slave on each other car connectable to the train bus master by the train bus for communicating with the train bus master, including the steps of: (a) determining whether the one car with the train bus master is located at one end of the train or is in the middle of the train by transmitting a test message from the train bus master onto the train bus and determining whether a train bus slave response is received from one or both directions relative to the location of the one car in the train; (b) transmitting first messages between the train bus master and each train bus slave, respectively, located in the one direction for assigning an address to each train bus slave located in that one direction and acquiring data at the train bus master uniquely identifying the respective train bus slaves in that one direction; and (c) transmitting, when the determining step determines that the one car is located in the middle of the train, second messages between the train bus master and each train bus slave, respectively, located in the other direction for assigning an address to each train bus slave located in the other direction and acquiring data at the train bus master uniquely identifying the respective slaves in the other direction.

A further aspect of the invention when the one car is in the middle of the train, a car at an end of the train in the one direction constitutes a tail end car and the step (b) involves transmitting a message from the train bus slave in the tail end car to the train bus master to indicate that it is the tail end car after it has been assigned its address and causing the train bus master to start step (c) in the other direction.

Another aspect of the invention wherein the train bus constitutes a first bus and the communication network includes a second train bus, further involves: repeating the steps (a), (b) and (c) on the second train bus; comparing the addresses and the unique identifying data assigned and acquired on the first and second train buses; and selecting one of the first and second train buses as a primary train bus and the other train bus as a back-up train bus based upon results of the comparing step.

Another aspect of the invention, wherein prior to the step (a), the train bus master is only connected by the train bus to train bus slaves directly adjacent to the train bus master and additional train bus slaves in either direction are only connected by the train bus to train bus slaves directly adjacent to the additional train bus slave, wherein the step (a), involves: (a1) transmitting the test message on the train bus only to the train bus slaves directly adjacent to the train bus master; (a2) transmitting the train bus slave responses from the train bus slaves directly adjacent to the train bus master on the train bus to the train bus master and detecting the number of such slave responses received at the train bus master, one slave response signifying at least one car present in only one direction and two slave responses signifying at least one car present in each direction.

In another aspect of the invention, step (b) further involves: (b1) transmitting the first messages between the train bus master and the train bus slave directly adjacent to the train bus master in the one direction for assigning the address to and acquiring the unique identifying data from that train bus slave, and (b2) polling that train bus slave as to the presence of a next adjacent train bus slave in the one direction; the method further including (d1) detecting, by each train bus slave, the presence of an additional train bus slave directly adjacent thereto in the one direction and communicating to the train bus master whether or not there is such an additional train bus slave in response to the polling step (b2), and if so forming a direct connection on the train bus between such additional train bus slave and the train bus master, and repeating the step (b) treating such additional train bus slave as the train bus slave directly adjacent to the train bus master, and (d2) if there is no such additional train bus slave, performing step (c) in an analogous manner as the step (b) in the other direction until the train is completely initialized.

The above and other objects, advantages and features are further accomplished by the provision of a method of christening a trainline monitor system for a train having a car carrying a train bus master, a train bus and at least one other car in a first direction from the car, the other car carrying a train bus slave connected to the train bus master via the train bus, including the steps of: determining whether there are any cars in a second direction from the train bus master; sequentially acquiring and storing respective information about each train bus slave on each car in the first direction of the train and assigning an address for each train bus slave on each car in the first direction of the train; and sequentially acquiring and storing, if there are cars in the second direction, respective information about each train bus slave on each car in the second direction of the train and assigning a respective address for each train bus slave on each car in the second direction of the train.

In accordance with another aspect of the invention, there is provided a method of christening a trainline monitor system having a primary train bus master and a back-up train bus master on a head car and at least one pair of redundant train bus slaves on a respective middle car, the redundant train bus slaves including a primary train bus slave and a back-up train bus slave each having a main channel and a back-up channel, the primary train bus master and the primary train bus slave interconnected in the trainline monitor system on a primary train bus and the back-up train bus master and the back-up train bus slave interconnected in the trainline monitor system on a back-up train bus, including the steps of determining whether there are any cars in a second direction from the primary train bus master; sequentially acquiring and storing respective information about each primary train bus slave on each car in the first direction of the train and assigning an address on the primary train bus slave for each primary train bus slave on each car in the first direction of the train; and sequentially acquiring and storing, if there are cars in the second direction, respective information about each primary train bus slave on the primary train bus on each car in the second direction of the train and assigning a respective address for each train bus slave on each car in the second direction of the train.

These and other objects, advantages and features are further accomplished by the provision of an apparatus for christening a trainline monitor system for a train having a car carrying a train bus master, a train bus having a main and an auxiliary channel and at least one other car in a first direction with a train bus slave connected to the train bus master via the train bus, including: determining means for determining whether there are any cars in a second direction from the train bus master; sequentially acquiring and storing means for sequentially acquiring and storing respective information about each train bus slave on each car in the first direction of the train and assigning an address for each train bus slave on each car in the first direction of the train and sequentially acquiring and storing, if there are cars in the second direction, respective information about each train bus slave on each car in the second direction of the train and assigning a respective address for each train bus slave on each car in the second direction of the train.

DETAILED DESCRIPTION OF PREFERRED EMBODIMENTS

Figure 1:
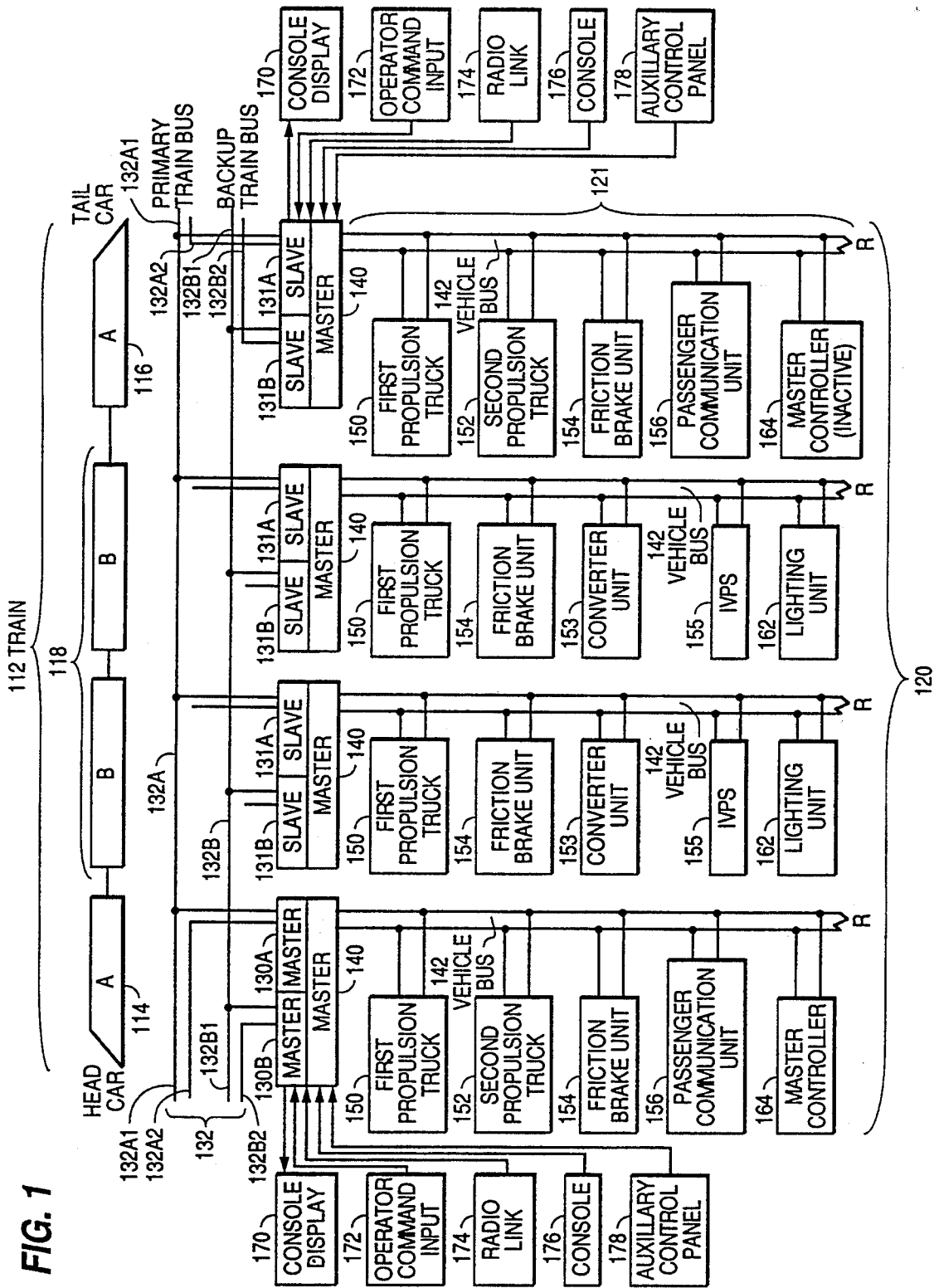
FIG. 1 is a schematic view of a train and its associated trainline monitor (TLM) system in which the present invention finds particular usefulness.

Referring now to FIG. 1, shown is a Trainline Monitor (TIM) System 120 in which the invention finds particular use. FIG. 1 shows a representative train 112 with a head car 114, a tail car 116, and middle cars 118. Only two middle cars 118 are shown, however a typical commuter train may have from one to ten middle cars 118 having essentially the same equipment on board.

Head car 114 has redundant train bus masters including primary train bus master 130A and back-up train bus master 130B as shown. Primary train bus master 130A serves as a master node for primary train bus 132A and back-up train bus master 130B serves as a master node for primary train bus back-up train bus 132B. Primary train bus 132A and back-up train bus 132B make up redundant train buses 132. In addition, middle cars 118 and tail car 116 each have redundant train bus slaves including primary train bus slaves 131A and back-up train bus slave 131B.

Primary train bus 132A has a main channel 132A1 and an auxiliary channel 132A2. Similarly, back-up train bus 132B has a main channel 132B1 and an auxiliary channel 132B2. Unless otherwise indicated, communications on primary train bus 132A take place on main channel 132A1 and communications on back-up train bus 132B take place on main channel 132B1. Communications on auxiliary channels 132A2 and 132B2 only occur when primary train bus slaves 132A and back-up train bus slave 132B "conclude" that they are on a tail car 116 as will be discussed below.

Each car 114, 116 and 118 has a vehicle bus master 140 with a vehicle bus 142. As used herein, trainline monitor system (TIM) 120 is intended to comprehend redundant train bus masters 130, redundant train bus slaves 131, redundant train buses 132, vehicle masters 140, vehicle buses 142 and intelligent subsystem interfaces (not separately shown) to vehicle buses 142 discussed below.

TIM system 120 interconnects the various subsystems. Examples of subsystems which may be found on head car 114 include first propulsion truck 150, second propulsion truck 152, friction brake unit 154 and passenger communication unit 156 as shown. Other subsystems may include a doors control unit (not shown), a heating, ventilation and air conditioning unit (HVAC) (not shown), a lighting unit 162, etc. Status information about the vehicle subsystems is requested, furnished and displayed according to the present invention.

Middle cars 118 can have the same subsystems as head car 114 but they typically would not have a second propulsion truck 152 or master controller 164 but instead would have a convertor unit 153 and an intermediate voltage power supply (IVPS) 155. Tail car 116 has the same subsystems as head car 114 but with an inactive master controller 164. The following discussion regarding train bus master 130A applies to train bus master 130B as well.

Head car 114 has, in addition to redundant train bus masters 130A and 130B, a console display 170, operator command input unit 172, radio link unit 174, console 176 and auxiliary control panel 178, which facilitate control and communications by a train operator.

Vehicle bus master 140 with redundant train bus masters 130A, 130B or redundant train bus slaves 131A, 131B can be embodied in three separate CPUs or a single CPU with a multitasking operating system and 3 separate I/O ports. Each of the train buses 132A and 132B, with its master and slave devices, are preferably configured as an HDLC packet communications network.

Referring to head car 114, vehicle bus master 140 communicates with one of redundant train bus masters 130A and 130B which in turn communicate with the rest of TLM system 120 via one of the primary train bus 132A and back-up train bus 132B, respectively. Vehicle bus 142 has predetermined nodes and therefore does not have to deal with such considerations as geographic addressing or car orientation. Vehicle bus 142 can be, for example, an Intel BITBUS in which case the subsystems would have BITBUS interfaces. BITBUS is a master-slave communication system that uses a multidrop RS-485 serial link. This provides a simple, expandable system to which all systems on the vehicle can easily interface. BITBUS messages are transmitted as synchronous data link control (SDLC) data packets. During operation, the SDLC-encoded messages and protocol ensure data integrity and provide a way to request data retransmission if necessary.

Vehicle bus master 140 and the various subsystems 150–156, etc., operate under standard master-slave communications protocols, such as Synchronous Data Link Control (SDLC), using a multidrop RS-485 serial link. Vehicle bus master 140, vehicle bus 142 and the various vehicle subsystems comprise a master-slave communication subsystem 121.

Communications on the TLM system will be described below, in particular, communications which provide information to an operator of the master vehicle processing system 101 about particular subsystems 150–156 on one or more representative vehicles 118 of the train 112 over the TLM communications network, as described with reference to FIG. 1.

TLM system 120 is connected to first and second propulsion trucks 150 and 152 by vehicle bus 142. The TLM system 120 can transmit test commands, propulsion commands, real-time clock synchronization information, etc., to the first and second propulsion trucks 150 and 152. First and second propulsion trucks 150 and 152 respond by transmitting back test results and status information over the TLM system 20.

In a like manner, TLM system 120 is connected to convertor unit 153 by vehicle bus 142. TLM system 120 can transmit test commands and convertor control commands such as convertor on/off, load shedding commands and real-time clock synchronization information, etc., to convertor unit 153. Convertor unit 153 responds by transmitting back test results and status information to TLM system 120.

TLM system 120 is connected to a friction brake unit 154 by vehicle bus 142. TLM system 120 transmits test commands, braking commands and real-time clock synchronization information, etc., to friction brake unit 154. Friction brake unit 154 responds by transmitting back test results and status information to TLM system 120.

TLM system 120 is also connected to an intermediate voltage power supply (IVPS) 155 and passenger communication unit 156 by vehicle bus 142. IVPS converts 600 volt power into 300 volts which is necessary since some of the subsystems, such as friction brake unit 154, use 300 volt power.

TLM system 120 transmits test commands, IVPS control commands, such as IVPS on/off commands, and real-time clock synchronization information, etc., to IVPS 155 and IVPS 155 responds by transmitting back test results and status information to TLM system 120. TLM system 120 transmits test commands, real-time clock synchronization information, car serial number, relative car position, car orientation information, zero speed commands, door open and close commands, and odometer or speed signals, etc., to passenger communication unit 156. Passenger communication unit 156 responds by transmitting back test results and status information to TLM system 120.

TLM system 120 is also connected to other subsystems, such as a door control unit (not shown), a heating, ventilation and air conditioning (HVAC) unit (not shown), and a lighting unit 162, by vehicle bus 142. TLM system 120 transmits test commands, status requests, real-time clock synchronization information, car orientation information, etc., to the units. The units respond by transmitting back test results and status information.

Operator command input unit 172 of head car 114 may be a waterproof piezo keyboard having piezo keys integrated into a 5 mm aluminum plate and operated through a 0.8 mm aluminum cover plate. Console display 170 may be an electroluminescent self-illuminated screen. Console 176 is a state driven device having a "power-up" state and a "operating" state.

If a car in train 112 is keyed-up, then operator console 176 is enabled and this car becomes the head car with redundant train bus masters 130A, 130B. At start-up, console display 170 displays results of power-up self-test. Then, TLM system 120 enters an "operating state." Console display 170 then displays a simple status message (OK, Warning, Failed or Non-existent) for each subsystem 150–164 on each car of train 112. The operator can use operator command input 172 to access diagnostic information on any of the subsystems 121 on any of the cars of train 112.

Information can also be transmitted or received by a wayside station using radio link 174 thereby reporting diagnostic alarms and acting as a diagnostic data dump at a specific point along the wayside.

In TLM 120 system shown in FIG. 1 in which the invention has particular usefulness, redundant train buses 132 are based on the DIN 43322 specification developed especially for the railroad environment, the subject matter of which is hereby incorporated by reference. It is configured as a master-slave communication system that uses a multi-drop RS-485 serial link. The serial data is Manchester encoded for higher reliability. This also allows it to pass through the galvanic isolation between cars. Train bus messages between vehicles are encoded into standard high level data link control (HDLC) data packets. During operation, the HDLC-encoded messages and protocol ensure data integrity and provide a way to request data retransmission if necessary.

Under normal operations, primary train bus master 130A periodically sends monitor commands or messages in the form of HDLC packets to primary train bus slaves 131A via primary train bus 132A which either modify operating conditions and/or receive diagnostic information from intelligent subsystems 150–164. Typically, primary train bus master 130A expects to receive an HDLC response packet within a predetermined time period (anywhere from milliseconds to several seconds). Hence, primary train bus master 130A determines the occurrence of a failure such as a lost primary train bus slave on primary train bus 132A if either the HDLC response packet contains incorrect data or the HDLC response packet is not received within the predetermined time period.

Redundant train buses 132 made up of primary train bus 132A and back-up train bus 132B are initialized or christened according to an embodiment of the invention. During christening, TLM system 120 determines which car in train 112 is head car 114, and consequently which car carries redundant train bus masters 130. TLM system 120 must also determine which cars are middle cars 118 and tail car 116 and consequently which cars carry train bus slaves 131. In addition, TLM system 120 must determine relative positions of middle cars 118 in train 112 and modify TLM system 120 when any middle cars 118 are added or deleted from train 112 and/or when any new trains are added to train 112.

Figure 1A:
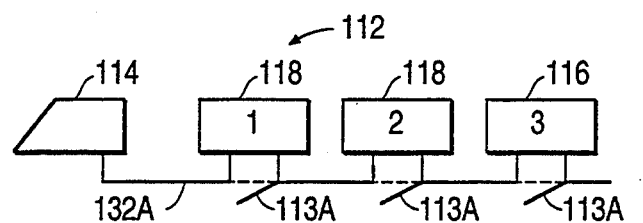
FIGS. 1A, 1B, and 1C illustrate conceptually three aspects of christening according to the invention.
Figure 1B:
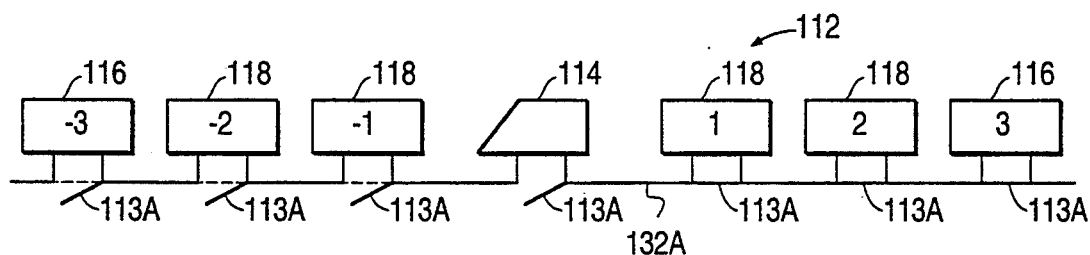
Figure 1C:
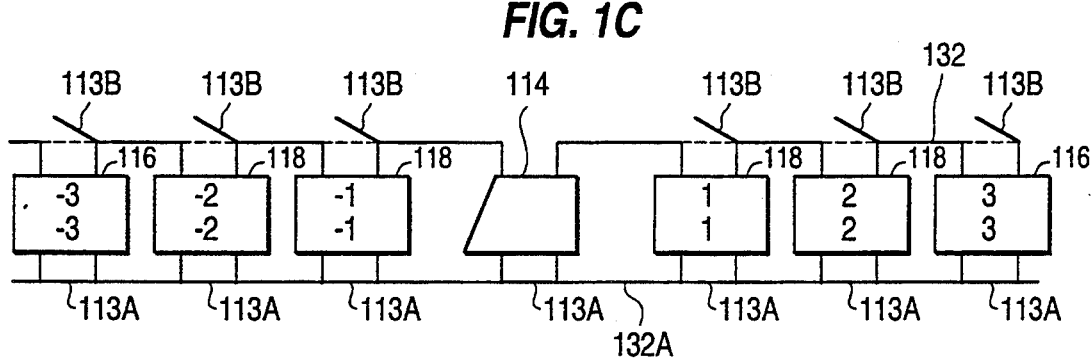

FIGS. 1A, 1B, and 1C illustrate conceptually three aspects of christening according to the invention. In the discussion below, the phrase "christening a car" means christening that car's primary train bus slave 131A or backup train bus slave 131B on primary train bus 132A or back-up train bus 132B, respectively.

FIG. 1A shows head car 114 at the front of train 112. Head car 114, middle cars 118 and tail car 116 each have relays and switches represented conceptually by switches 113A (a solid line indicating an open switch and dashed line indicating a closed switch) which interconnect primary train bus master 130A with primary train bus slaves 132A using primary train bus 132A. Primary train bus master 130A on head car 114 sends a message on primary train bus 132A to determine if there are any primary train bus slaves 131A on primary train bus 132A. Since all of switches 113A are open at the outset of christening, only primary train bus slave 131A on middle car 118 immediately following (adjacent to) head car 132A receives the messages sent by primary train bus master 130A. That primary train bus slave 131A in turn sends a response to primary train bus master 130A providing information such as a serial number identifying that adjacent car. Primary train bus master 130A in turn assigns primary train bus slave 131A on the adjacent car an address of "1" and primary train bus slave 131A in turn closes its switch 113A thereby connecting primary train bus slave 131A on next middle car 118 to the right of adjacent middle car 118 with address "1".

The above process is repeated for the next car to the right. Namely, primary train bus master 130A on head car 114 sends the same message on primary train bus 132A. However, this time the message is broadcast to both middle cars 118. Since primary train bus slave 131A on middle 118 directly to the right of head car 114 has an assigned address (namely, "1"), it ignores the message output from primary train bus master 130A. However primary train bus slave 131A on middle car 118 directly to the right of middle car 118 carrying primary train bus slave 130A with address "1" receives the message and the process proceeds as described above only in this case primary train bus master 130A assigns primary train bus slave 131A an address of "2". This is repeated until all primary train bus slaves 131A on train 112 in FIG. 1A have an assigned address.

FIG. 1B shows christened train 112 of FIG. 1A which has additional middle cars 118 and tail car 116 to the left of head car 114. Once middle cars 118 to the right of head car 114 have been christened as discussed above, head car 114 isolates the christened half of the bus and proceeds to christen the cars to the left of head car 114 the same way it christened the cars to its right but with negative rather than positive addresses.

FIG. 1C shows conceptually train 112 with both primary train bus 132A and back-up train bus 132B. Christening of primary train bus slave 131A on primary train bus 132A proceeds as in discussed with respect to FIG. 1B. Once primary train bus master 132A has christened primary train bus 132A, primary train bus master 132A christens back-up train bus 132B by christening back-up train bus slaves 131B in middle cars 118 and end car 116 to the right of head car 114 and then christening back-up train bus slaves 131B in middle cars 118 and tail car 116 to the left of head car 114. Alternatively, primary train bus master 130A can, after christening primary train bus 132A, pass control to back-up train bus master 130B which proceeds to christen back-up train bus 132B in the same manner primary train bus master 130A christens primary train bus 132A. Christening of train 112 involves initializing redundant train bus masters 130A, 130B and redundant train bus slaves 131A, 131B on primary train bus 132A and back-up train bus 132B, respectively.

Figure 3A:
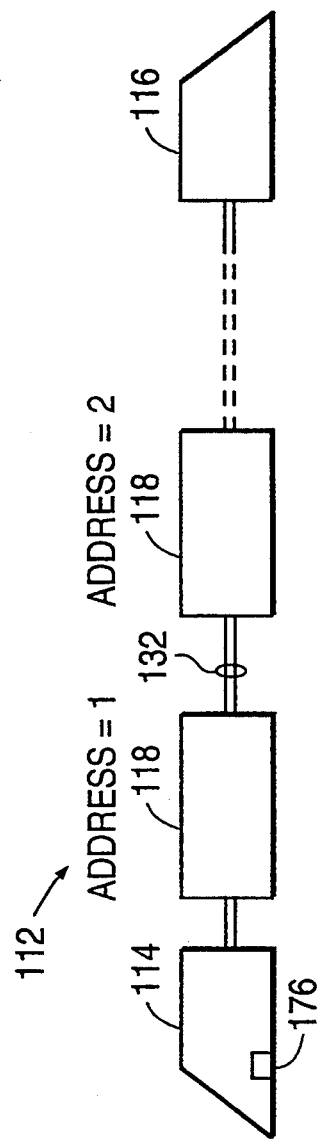
FIGS. 3A and 3B are schematic representations of two situations in which head car 114 is at the head of the train and is not at the head of the train, respectively.
Figure 3B:
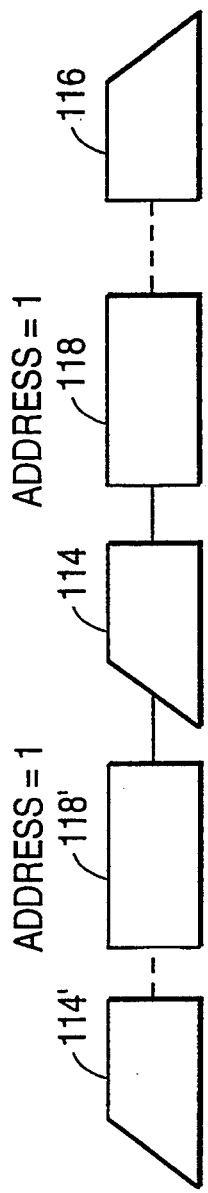
Figure 4:
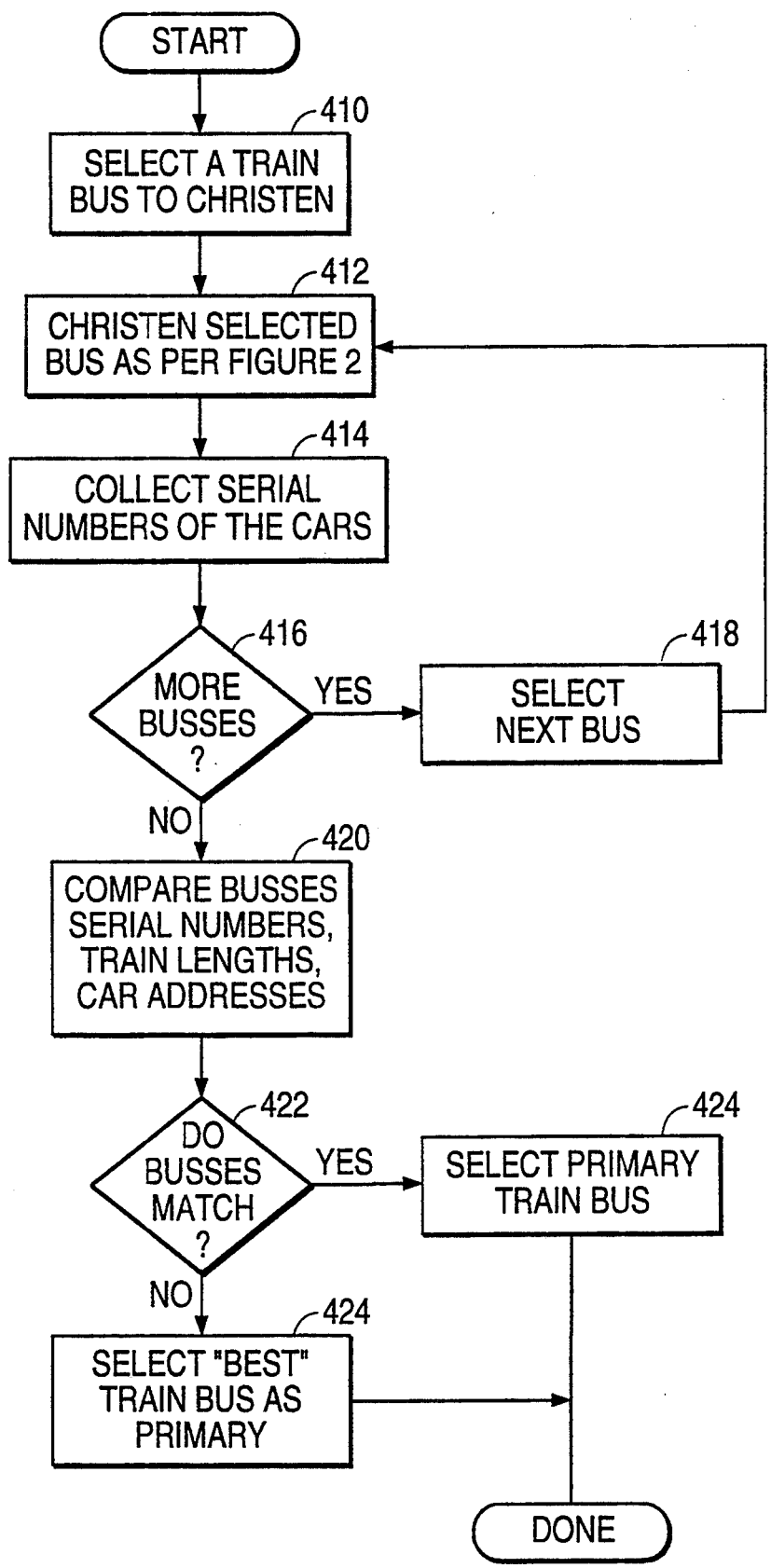
FIG. 4 is a flow chart of how the redundant train buses are christened.

Christening will now be described in more detail with respect to primary train bus 132A using steps in FIG. 2 for two situations shown in FIGS. 3A and 3B. In particular, FIGS. 3A and 3B show train 112 when head car 114 is and is not at the front of train 112, respectively. FIG. 4 then shows how the christening process is repeated to account for redundancy of train buses 132.

Figure 2:
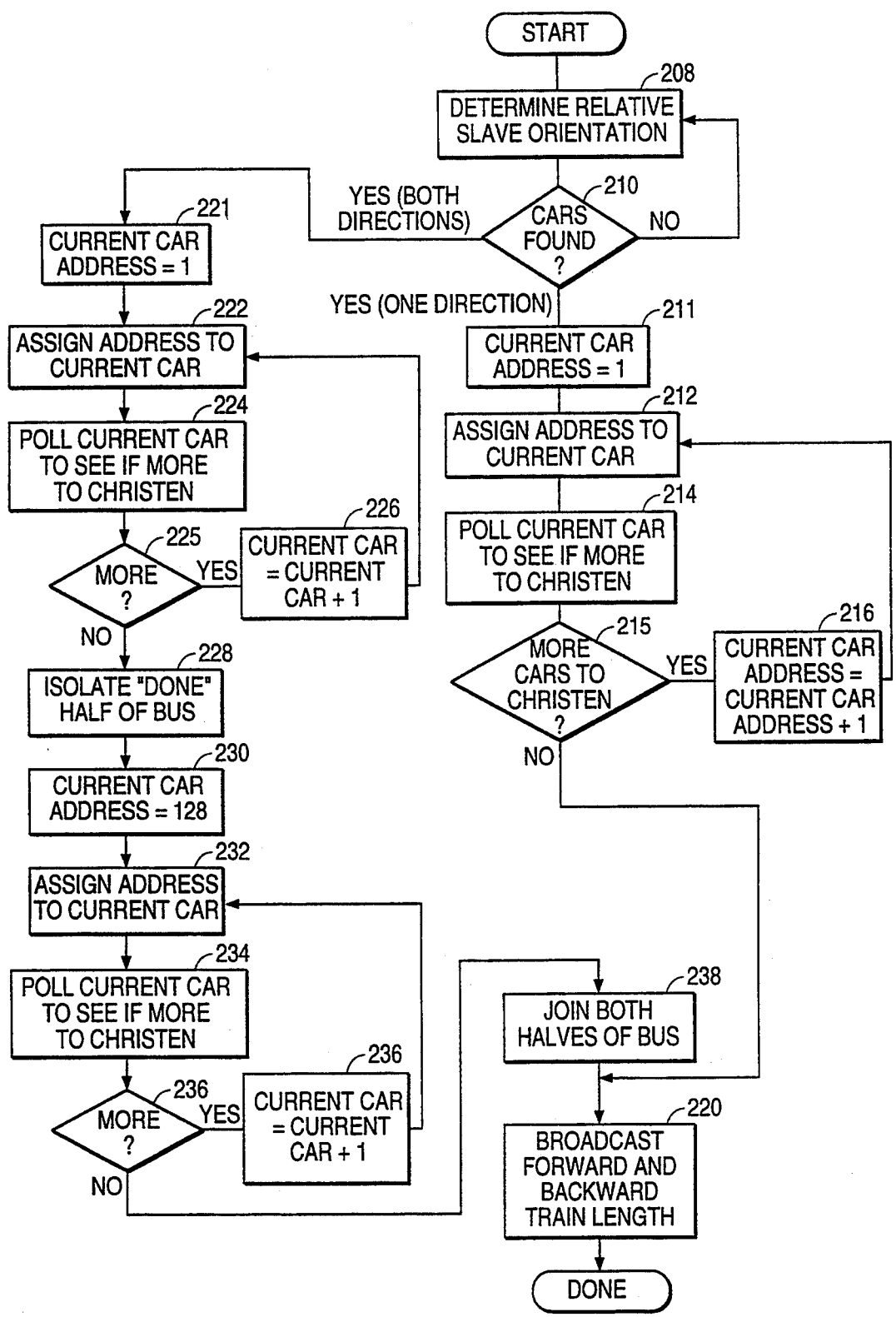
FIG. 2 is a flow chart showing the steps involved in christening one train bus of train 112 according to one embodiment of the invention.

FIG. 2 is a flow chart showing the steps involved in christening one train bus of train 112 according to one embodiment of the invention. Assume that primary train bus master 130A, primary train bus slaves 131A and primary bus 132A are active. Each car in train 112 in FIG. 3A is christened one by one starting with middle car 118 directly following head car 114 which is also at the front of the train. Here, the car currently being christened will be referred to as the current car.

Primary train bus 132A is interconnected from car to car via two channels, main channel 132A1 and auxiliary channel 132A2 as discussed above. When primary train bus slave 131A receives a TEST command message from a primary train bus master 130A, its relays are set to receive commands on main channel 132A1 and auxiliary channel 132A2 of primary train bus 132A. Primary train bus slave 131A then opens and closes relays (not shown) on main channel 132A1 and auxiliary channel 132A2 in such a way that communications can be sent and received on main channel 132A1 only in the direction from which it received the TEST command and can be sent and received on auxiliary channel 132A2 only in the direction opposite from which it received the TEST command as discussed in Part 3 of "Serial Interfaces to Programmable Electronic Equipment For Rail Vehicles". An analogous situation holds for back-up train bus master 130B, back-up train bus slaves 131B with main channel 132B1 and auxiliary channel 132B2 of back-up train bus 132B.

Suppose an operator keys up a console 176 in head car 114 carrying primary train bus master 130A and the current car is middle car 118 directly to the right of head car 114 as shown in FIG. 3A. Primary train bus master 130A must begin by determining relative orientations of redundant train bus slaves 131 at step 208. In particular, primary train bus master 130A broadcasts an HDLC TEST message on primary train bus 132 to determine whether any primary train bus slaves 131A are present. Since in FIG. 3A a primary train bus slave 131A is present in only one direction (to the right of head car 114) and since the relays on main channel 131A1 and auxiliary channel 131A2 operate as described above, primary train bus master 130A receives only one HDLC response packet message from primary train bus slaves 131A from the current car. This signifies to primary train bus master 130A that there is at least one additional car in one direction only. (If primary train bus master 130A receives two HDLC response packets, it concludes that there are primary train bus slaves 131A on cars in both directions as will be discussed below.) Upon receiving the one HDLC response packet, primary train bus master 132A sets a variable called "car address" to "1" representing the address of that primary train bus slave 131A on primary train bus 132A at step 211. Primary train bus master 130A then assigns the current car an address corresponding to that value of "car address."

Primary train bus master 130A then polls primary train bus slave 131A on the current car at step 214 to see if primary train bus slave 131A on the current car has detected an additional train bus slave 131A on an additional car on train 112 which must be christened. (Primary train bus slave 131A acquires this information by checking its auxiliary channel 132A2 as will be discussed with regard to FIG. 5B below). If at step 215 primary train bus master 131A determines from polling step 214, that there is an additional train bus slave 131A and hence an additional car to christen, primary train bus master 130A increases the value of "car address" by 1 at step 216 and consequently primary train bus master 130A assigns a next car a next address on primary train bus 132A at step 212. Steps 212, 214, 215 and 216 are repeated until all cars on train 112 in the direction behind head car 114 have primary train bus slaves 131A with addresses on primary train bus 132A. Finally, if polling step 214 determines that there are no more cars to christen, primary train bus master 130A broadcasts on primary train bus 132A that christening is complete for primary train bus 132A at step 220.

Referring back to step 210, if primary train bus master 132A had determined that there are additional cars found in two directions from the head car as would be the case for example in FIG. 3B where head car 114 is between a front car 114' and tail car 116, then again primary train bus master 130A sets a value for "car address" equal to 1 at step 221 and assigns an address corresponding to the current value of "car address" to primary train bus slave 131A on the current car at step 222. Primary train bus slave 131A on the current car is then polled at step 224 by primary train bus master 130A to determine if more cars (to the right in FIG. 3B) need to be christened. If more cars need to be christened, i.e., if the current car has a next car (to its right on FIG. 3B), then the value of "car address" is increased by 1 at step 226 similar to step 216 above and the next car is assigned an address corresponding to "car address"+1=2 at step 222. This is continued until there are no more cars in that direction (to the right in FIG. 3B) to christen. Since cars exist to the left of head car 114 as shown in FIG. 3B, primary train bus 132A at step 228 is only "half" christened, i.e., christened in only one direction. In this case, the value of "car address" is set to 128 at step 230 and steps 232, 234 and 236 then perform the same functions as 222, 224 and 226, respectively. However, since "car address" was set equal to 128 rather than 1, the addresses assigned to previous cars will be in two's complement form, $-1, -2, \ldots$, becoming more negative for each car to the left of head car 114 in FIG. 3B. After train 112 is completely christened, primary train bus master 130A combines information for cars to its left and right at step 238 and broadcasts the train length on primary train bus 132A at step 220.

FIG. 4 is a flow chart of how primary train bus master 130A christens redundant train buses 132A and 132B. Step 410 involves selecting one of redundant train buses 132A or 132B to christen. Step 412 involves christening the bus selected in step 410 in accordance with the above-discussed process of FIG. 2. Once step 220 is complete, TLM system 120 collects serial numbers for all primary train bus slaves on cars in train 112 at step 414. Step 416 involves determining whether there are any additional buses which must be initialized. If yes, then step 418 selects that bus and steps 412, 414 and 416 are repeated thereby christening train bus.

TLM system 120 compares information for both christened buses such as "car address," "car serial number" and total length of train 112 at step 420. If this information matches car for car, one of the christened buses is picked to be primary train bus at step 422. If, on the other hand, this information does not match car for car, then the primary train bus master 130A, and back-up train bus master 130B send their respective values for car addresses, car serial numbers and train length to console display 170 and an operator selects (via console 176) the bus which most closely corresponds to train 112 at step 424 and that bus becomes primary bus 132A and the other bus becomes back-up train bus 132B.

Figure 5A:
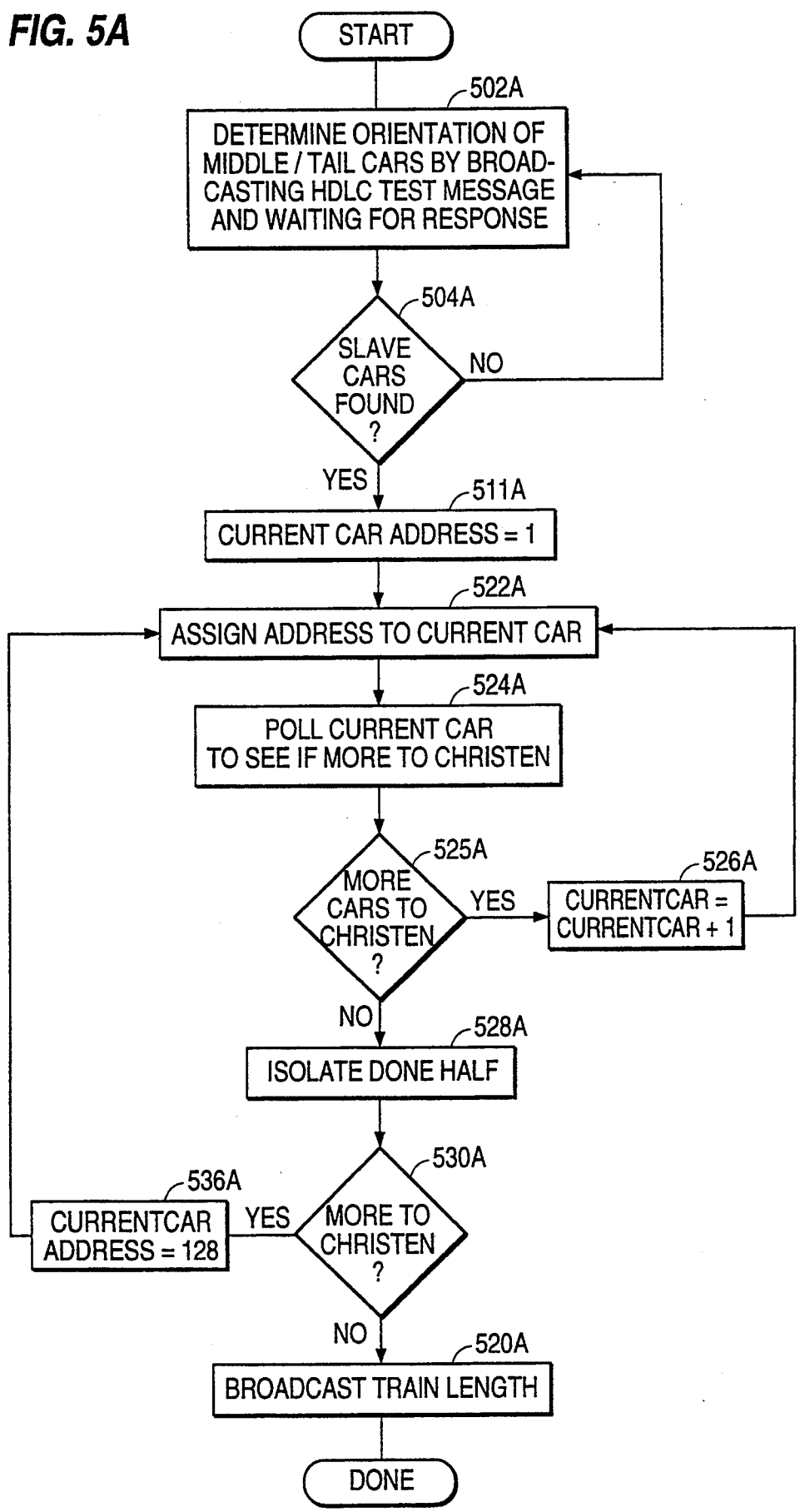
FIGS. 5A and 5B are flow charts showing processes to be simultaneously conducted by the primary train bus master and a primary train bus slave on the current car of the trainline monitor system.
Figure 5B:
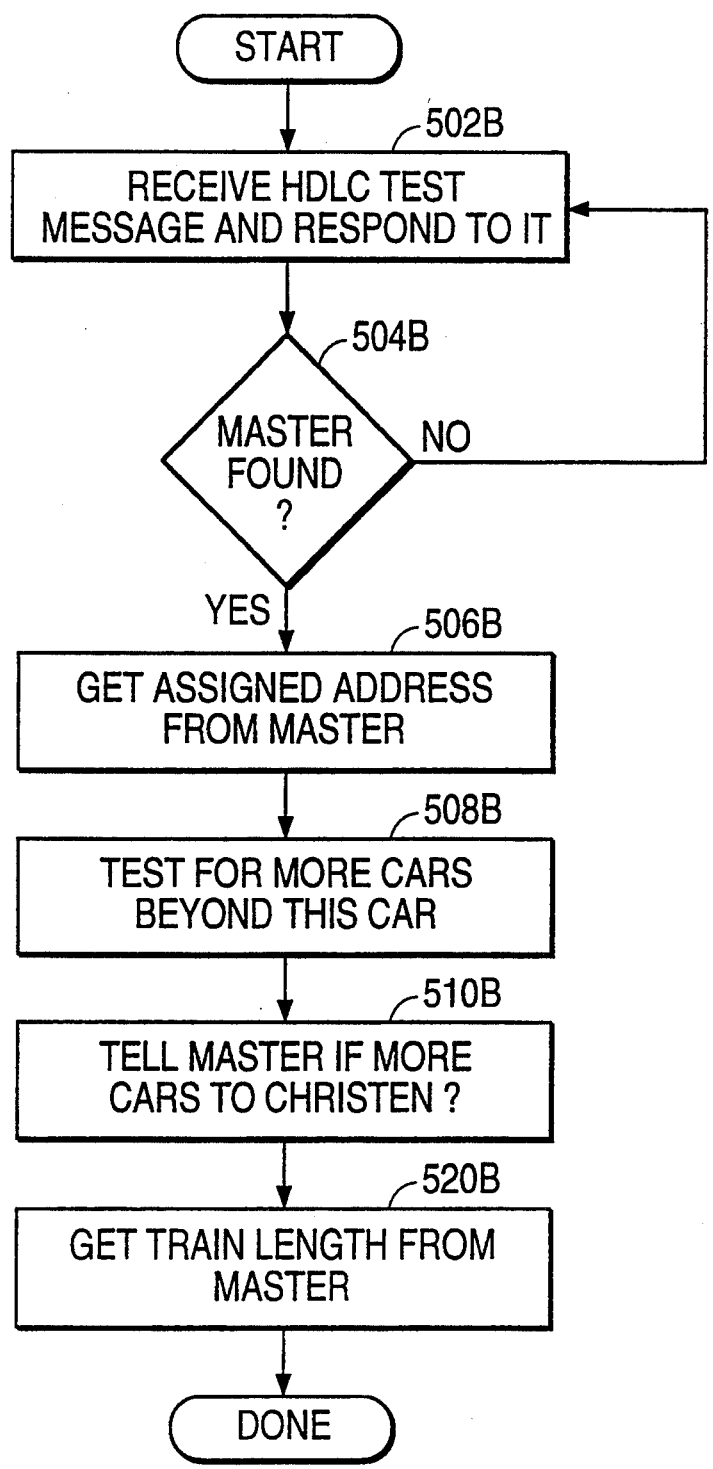

FIGS. 5A and 5B are flow charts showing processes to be simultaneously conducted by primary train bus master 130A and primary train bus slave 131A on the current car, respectively, during christening of primary train bus 132A. These processes are also conducted by back-up train bus master 130B and back-up train bus slave 131B during christening of back-up train bus 132B, respectively. At step 502A, primary train bus master 130A attempts to determine the orientation of any neighboring middle cars 118 or tail car 116 with respect to head car 114 carrying primary train bus master 130A. In particular, primary train bus master 130A broadcasts an HDLC TEST packet in two directions alternately on primary train bus 132A and waits for responses to that message after each broadcast at step 504A in FIG. 5A.

Meanwhile, referring to FIG. 5B, all primary train bus slaves 131A (a current car has not yet been determined) are simultaneously attempting to determine their orientation with respect to any master nodes at step 502B by repeatedly listening for an HDLC TEST packet and alternating their direction of listening. Primary train bus slaves 131A which are directly on one or both sides of primary train bus master 130A determine that there is a primary train bus master 130A when they receive the HDLC TEST message at step 504B and accordingly open and close relays so that they can communicate with primary train bus master 130A on main channel 132A1. Primary train bus master 130A determines whether there are primary train bus slaves 131A at step 504A in FIG. 5A when it receives an HDLC TEST response to its HDLC TEST command.

Primary train bus master 130A initializes a "current car" variable to be "1" at step 511A. After primary train bus slave 131A determines that primary train bus master 130A is present at step 502B, it receives its assigned address on main channel 132A1 of primary train bus 132A from primary train bus master 130A at step 506B.

At step 508B, the current car (a primary train bus slave 131A) determines whether or not there are additional cars beyond it by periodically sending HDLC TEST messages on auxiliary channel 132A2 of primary train bus 132A and listens for any HDLC TEST response messages from a primary train bus slave 131A on a next car. Depending on whether primary train bus slave 131A on the current car receives an HDLC TEST response message, it knows whether there is or is not an additional primary train bus slave 131A and consequently that it is or is not on a tail car 116. If primary train bus slave 131A determines that it is not on a tail car, it informs primary train bus master 130A that there are more cars to christen at step 510B and it disconnects communications on auxiliary channel 132A2 from the previous car and bridges main channel 132A1 to the next car. The next car then becomes the current car and its primary train bus slave 131A begins to determine in accordance with step 508B whether or not it is on tail car 116 by sending HDLC TEST messages on auxiliary channel 132A2 and checking auxiliary channel 132A2 of primary train bus 132A in accordance with step 508B.

Primary train bus master 130A assigns an address to subsequent primary train bus slaves 131A on cars behind the current car in accordance with steps 522A, 524A, 525A and 526A in FIG. 5A (corresponding to steps 222, 224, 225 and 226 in FIG. 4). Each time primary train bus master 130A completes one loop of steps 522A, 524A, 525A and 526A the respective primary train bus slave 131A is christened and then the next car becomes the current car. Likewise, steps 502B, 504B, 506B and 508B are repeated until the current car carrying primary train bus slave 131A is tail car 116 at which point christening is complete for all cars in one direction from primary train bus master 130A i.e., christening is "half done" as discussed above. In accordance with step 228 of FIG. 2, primary train bus master 130A isolates the completed or done portion of primary train bus 132A and checks main channel 132A1 of primary train bus 132A in the opposite direction to determine whether there are any more cars to christen at step 530A. If not, the train is christened, but if so, "car address" is set equal to 128 at step 536A corresponding to step 236 of FIG. 2, and steps 522A, 524A, 525A and 526A are repeated until all cars have been christened and primary train bus master 130A broadcasts the train length at step 520A corresponding to step 220 of FIG. 2. Primary train bus slaves 131A likewise receive train length information at 520B thereby completing the christening of the primary train bus 132A of TLM system 120 of train 112 in two directions and the two halves of the primary train bus 132A are then joined. Finally, back-up train bus 132B is christened in a manner analogous to primary train bus 132A and this redundant bus christening takes place in accordance with FIG. 4.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A method for initializing a communication network in a train including a plurality of cars, the network comprising a train bus, a train bus master on one of the cars and a train bus slave on each other car for connection to the train bus master by the train bus for communicating with the train bus master, comprising the steps of:

(a) determining whether the one car with the train bus master is located at an end of the train or is in between other cars of the train by transmitting a test message from the train bus master onto the train bus and determining whether a train bus slave response is received from one or both directions relative to the location of the one car in the train;

(b) transmitting first messages between the train bus master and each train bus slave, respectively, located in the one direction for assigning an address to each train bus slave located in that one direction and acquiring data at the train bus master uniquely identifying the respective train bus slaves in that one direction; and (c) transmitting, when said determining step determines that the one car is located in between other cars of the train, second messages between the train bus master and each train bus slave, respectively, located in the other direction for assigning an address to each train bus slave located in the other direction and acquiring data at the train bus master uniquely identifying the respective slaves in the other direction.

2. The method of claim 1, wherein said step (b) includes assigning positive, increasing numbers as addresses to the train bus slaves starting with the train bus slave in a car which is adjacent to the one car in the one direction, and said step (c) includes assigning negative, decreasing numbers as addresses to the train bus slaves starting with the train bus slave in a car which is adjacent to the one car in the other direction.

3. The method of claim 2, wherein when the one car is in between other cars of the train, a car at an end of the train in the one direction constitutes a tail end car and said step (b) includes transmitting a message from the train bus slave in the tail end car to the train bus master to indicate that it is the tail end car after it has been assigned its address and causing the train bus master to start step (c) in the other direction.

4. The method of claim 1, wherein prior to said step (a), the train bus master is only connected by the train bus to train bus slaves directly adjacent to the train bus master and additional train bus slaves in either direction are only connected by the train bus to train bus slaves directly adjacent to the additional train bus slave, wherein said step (a) further includes:

(a1) transmitting the test message on the train bus only to the train bus slaves directly adjacent to the train bus master;

(a2) transmitting the train bus slave responses from the train bus slaves directly adjacent to the train bus master on the train bus to the train bus master and detecting the number of such slave responses received at the train bus master, one slave response signifying at least one car present in only one direction and two slave responses signifying at least one car present in each direction.

5. The method of claim 4, wherein said step (b) further includes:

(b1) transmitting the first messages between the train bus master and the train bus slave directly adjacent to the train bus master in the one direction for assigning the address to and acquiring the unique identifying data from that train bus slave, and (b2) polling that train bus slave as to the presence of a next adjacent train bus slave in the one direction;

said method further including (d1) detecting, by each train bus slave, the presence of an additional train bus slave directly adjacent thereto in the one direction and communicating to the train bus master whether or not there is such an additional train bus slave in response to said polling step (b2), and if so forming a direct connection on the train bus between such additional train bus slave and the train bus master, and repeating said step (b) treating such additional train bus slave as the train bus slave directly adjacent to the train bus master, and (d2) if there is no such additional train bus slave, performing step (c) in an analogous manner as said step (b) in the other direction until the train is completely initialized.

6. A method for initializing a communication network in a train including a plurality of cars, the network comprising a train bus, a train bus master on one of the cars and a train bus slave on each other car for connection to the train bus master by the train bus for communicating with the train bus master, comprising the steps of:

(a) determining whether the one car with the train bus master is located at an end of the train or is in between other cars of the train by transmitting a test message from the train bus master onto the train bus and determining whether a train bus slave response is received from one or both directions relative to the location of the one car in the train;

(b) transmitting first messages between the train bus master and each train bus slave, respectively, located in the one direction for assigning an address to each train bus slave located in that one direction and acquiring data at the train bus master uniquely identifying the respective train bus slaves in that one direction; and (c) transmitting, when said determining step determines that the ode car is located in between other cars of the train, second messages between the train bus master and each train bus slave, respectively, located in the other direction for assigning an address to each train bus slave located in the other direction and acquiring data at the train bus master uniquely identifying the respective slaves in the other direction;

wherein the train bus constitutes a first bus and the communication network includes a second train bus, and said method further includes:

(d) determining whether the one car with the train bus master is located at an end of the train or is in between other cars of the train by transmitting a test message from the train bus master onto the second train bus and determining whether a train bus slave response is received from one or both directions relative to the location of the one car in the train;

(e) transmitting first messages between the train bus master and each train bus slave, respectively, located in the one direction for assigning an address to each train bus slave located in that one direction and acquiring data at the train bus master uniquely identifying the respective train bus slaves in that one direction; and (f) transmitting, when said determining step determines that the one car is located in between other cars of the train, second messages between the train bus master and each train bus slave, respectively, located in the other direction for assigning an address to each train bus slave located in the other direction and acquiring data at the train bus master uniquely identifying the respective slaves in the other direction;

comparing the addresses and the unique identifying data assigned and acquired on the first and second train buses; and selecting one of the first and second train buses as a primary train bus and the other train bus as a back-up train bus based upon results of said comparing step.

7. The method of claim 6, wherein said selecting step includes selecting either one of the first and second train buses as the primary train bus if the results of said comparing step indicate a complete match between the addresses and unique identifying data assigned and acquired on the first and second buses.

8. The method of claim 6, further comprising displaying the addresses and unique identifying data on an operator's console when there is not a complete match between the addresses and unique identifying data assigned and acquired on the first and second buses, wherein said selecting step includes making a manual selection of the primary bus based at least in part upon the displayed information.

9. The method of claim 6, wherein said step (b) includes assigning positive, increasing numbers as addresses to the train bus slaves starting with the train bus slave in a car which is adjacent to the one car in the one direction, and said step (c) includes assigning negative, decreasing numbers as addresses to the train bus slaves starting with the train bus slave in a car which is adjacent to the one car in the other direction.

10. The method of claim 9, wherein when the one car is in between other cars of the train, a car at an end of the train in the one direction constitutes a tail end car and said step (b) includes transmitting a message from the train bus slave in the tail end car to the train bus master to indicate that it is the tail end car after it has been assigned its address and causing the train bus master to start step (c) in the other direction.

11. A method for initializing a communication network in a train including a plurality of cars, the network comprising a train bus, a train bus master on one of the cars and a train bus slave on each other car for connection to the train bus master by the train bus for communicating with the train bus master, comprising the steps of:

(a) determining whether the one car with the train bus master is located at an end of the train or is in between other cars of the train by transmitting a test message from the train bus master onto the train bus and determining whether a train bus slave response is received from one or both directions relative to the location of the one car in the train;

(b) transmitting first messages between the train bus master and each train bus slave, respectively, located in the one direction for assigning an address to each train bus slave located in that one direction and acquiring data at the train bus master uniquely identifying the respective train bus slaves in that one direction; and (c) transmitting, when said determining step determines that the one car is located in between other cars of the train, second messages between the train bus master and each train bus slave, respectively, located in the other direction for assigning an address to each train bus slave located in the other direction and acquiring data at the train bus master uniquely identifying the respective slaves in the other direction;

wherein prior to said step (a), the train bus master is only connected by the train bus to train bus slaves directly adjacent to the train bus master and additional train bus slaves in either direction are only connected by the train bus to train bus slaves directly adjacent to the additional train bus slave, wherein said step (a) further includes:

(a1) transmitting the test message on the train bus only to the train bus slaves directly adjacent to the train bus master;

(a2) transmitting the train bus slave responses from the train bus slaves directly adjacent to the train bus master on the train bus to the train bus master and detecting the number of such slave responses received at the train bus master, one slave response signifying at least one car present in only one direction and two slave responses signifying at least one car present in each direction;

wherein said step (b) further includes:

(b1) transmitting the first messages between the train bus master and the train bus slave directly adjacent to the train bus master in the one direction for assigning the address to and acquiring the unique identifying data from that train bus slave, and (b2) polling that train bus slave as to the presence of a next adjacent train bus slave in the one direction;

said method further including (d1) detecting, by each train bus slave, the presence of an additional train bus slave directly adjacent thereto in the one direction and communicating to the train bus master whether or not there is such an additional train bus slave in response to said polling step (b2), and if so forming a direct connection on the train bus between such additional train bus slave and the train bus master, and repeating said step (b) treating such additional train bus slave as the train bus slave directly adjacent to the train bus master, and (d2) if there is no such additional train bus slave, performing step (c) in an analogous manner as said step (b) in the other direction until the train is completely initialized; and wherein the train bus includes a main channel and an auxiliary channel and said method further includes performing said steps (a), (b) and (c) on the main channel and performing said step of detecting the presence of an additional train bus slave on the auxiliary channel.

12. A method for initializing a communication network in a train including a plurality of cars, the network comprising redundant first and second train buses, a train bus master node on one of the cars and a train bus slave node on each other car for connection to the train bus master node by the redundant first and second train buses for communicating with the train bus master node, comprising the steps of:

(a) transmitting with the train bus master node, respective first messages over the first train bus between the train bus master node and each train bus slave node, for assigning first addresses to the respective train bus slave nodes and acquiring associated identification data at the train bus master node uniquely identifying the respective train bus slave nodes;

(b) transmitting respective second messages over the second train bus between the train bus master node and each train bus slave node, for assigning second addresses to the respective train bus slave nodes and acquiring associated identification data at the train bus master node uniquely identifying the respective slaves;

(c) comparing the first addresses and associated identification data acquired in step (a) with the second addresses and associated identification data acquired in step (b); and (d) selecting one of the first and second train buses as a primary train bus for handling communication between the train bus master node and the train bus slave nodes and the other train bus as a back-up train bus for handling communication between the train bus master node and the train bus slave nodes independance of the comparison performed in said step (c).

13. The method of claim 12, wherein the train bus master node includes first and second primary train bus masters, each train bus slave node comprises first and second train bus slaves, the first train bus master and the first train bus slaves for connection to the first train bus and the second train bus master and second train bus slaves for connection to the second train bus, wherein:

said step (a) includes transmitting the first messages between the first train bus master and the first train bus slaves over the first train bus; and said step (b) includes transmitting the second messages between the second train bus master and the second train bus slaves over the second train bus.

14. The method of claim 12, wherein said selecting step includes selecting either one of the first and second train buses as the primary train bus if the results of said comparing step (c) indicate a match between the addresses and unique identifying data assigned and acquired on the first and second buses.

15. The method of claim 12, further comprising displaying the addresses and unique identifying data on an operator's console when there is not a complete match between the addresses and unique identifying data assigned and acquired on the first and second buses, wherein said selecting step includes making a manual selection of the primary bus based at least in part upon the displayed information.

16. A method of christening a trainline monitor system for a train having a first car carrying a train bus master, a train bus and at least one other car in a first direction of the train from the first car, the other car carrying a train bus slave connected to the train bus master via the train bus, comprising the steps of:

determining, with the train bus master, whether there are any cars in a second direction of the train from the train bus master;

sequentially acquiring and storing respective information about each train bus slave on each car in the first direction of the train from the train bus master and assigning an address for each train bus slave on each car in the first direction of the train from the train bus master; and sequentially acquiring and storing with the train bus master, if there are cars in the second direction of the train from the train bus master, respective information about each train bus slave on each car in the second direction of the train from the train bus master and assigning a respective address for each train bus slave on each car in the second direction of the train from the train bus master.

17. An apparatus for christening a trainline monitor system for a train having a first car carrying a train bus master, at least one train bus and at least one other car in a first direction of the train from the train bus master carrying a train bus slave connected to the train bus master via the at least one train bus, comprising:

determining means for determining whether there are any cars in a second direction of the train from the train bus master;

sequentially acquiring and storing means for sequentially acquiring and storing respective information about each train bus slave on each car in the first direction of the train from the train bus master and assigning an address for each train bus slave on each car in the first direction of the train from the train bus master and for sequentially acquiring and storing, if there are cars in the second direction of the train from the train bus master, respective information about each train bus slave on each car in the second direction of the train from the train bus master and assigning a respective address for each train bus slave on each car in the second direction of the train from the train bus master.

18. The apparatus for christening a trainline monitor system as claimed in claim 17, wherein said at least one train bus includes a primary train bus and a back-up train bus, and wherein said determining and sequentially acquiring and storing means further comprises means for determining and sequentially acquiring and storing information about each train bus slave on each car in the first direction of the train and assigning an address for each train bus slave on the back-up train bus on each car in the first direction of the train and for sequentially acquiring and storing, if there are cars in the second direction, respective information about each train bus slave on the back-up train bus on each car in the second direction of the train and assigning a respective address for each train bus slave on each car in the second direction of the train.

* * * * *